(12) United States Patent
Trenchard et al.

(10) Patent No.: US 11,197,433 B2
(45) Date of Patent: Dec. 14, 2021

(54) SOLAR-REACTIVE MULCH FILM

(71) Applicants: Douglas Michael Trenchard, Kenmore (AU); Robert Charles Trenchard, Salisbury (AU)

(72) Inventors: Douglas Michael Trenchard, Kenmore (AU); Robert Charles Trenchard, Salisbury (AU)

( * ) Notice: Subject to any disclaimer, the term of this patent is extended or adjusted under 35 U.S.C. 154(b) by 421 days.

(21) Appl. No.: 15/544,477

(22) PCT Filed: Aug. 2, 2016

(86) PCT No.: PCT/AU2016/050694
§ 371 (c)(1),
(2) Date: Jul. 19, 2017

(87) PCT Pub. No.: WO2017/193155
PCT Pub. Date: Nov. 16, 2017

(65) Prior Publication Data
US 2018/0220597 A1    Aug. 9, 2018

(30) Foreign Application Priority Data
May 10, 2016   (AU) ................................ 2016901723

(51) Int. Cl.
*A01G 13/02*     (2006.01)
*B32B 27/32*     (2006.01)
(Continued)

(52) U.S. Cl.
CPC .......... *A01G 13/0275* (2013.01); *B29C 48/00* (2019.02); *B29C 48/28* (2019.02);
(Continued)

(58) Field of Classification Search
CPC ........ B32B 2307/736; B32B 2264/108; B32B 27/32; B32B 27/327; B32B 2307/514;
(Continued)

(56) References Cited

U.S. PATENT DOCUMENTS 3,891,737 A    6/1975  Marsh et al.
4,277,594 A    7/1981  Matthews et al.
(Continued)

FOREIGN PATENT DOCUMENTS

CN    103709778 A  *  4/2014
JP    S51-103643 A    9/1976
(Continued)

OTHER PUBLICATIONS

Machine translation of CN103709778A, published Apr. 2014. (Year: 2014).*

(Continued)

*Primary Examiner* — Monique R Jackson
(74) *Attorney, Agent, or Firm* — EcoTech Law Group, P.C.

(57) ABSTRACT

A solar reactive mulch film comprising one or more layers of heat shrink material pre-strained at a predetermined temperature and tension. Immediately cooling the pre-strained layers retains molecular deformation stresses in the material which facilitate shrinkage but not expansion on exposure to solar radiation. The mulch film adapted to be laid over longitudinal growing beds and held tautly by burying its side edges in soil. Exposure of uncovered portions of film to solar radiation causes shrinkage in one or more directions whereby in combination with the weight of the soil holding it down, maintains tautness of the mulch over a growing period. Methods of manufacture and use of the same.

17 Claims, 5 Drawing Sheets

(51) Int. Cl.
*C08J 5/18* (2006.01)
*B32B 27/08* (2006.01)
*B32B 27/18* (2006.01)
*B29C 55/06* (2006.01)
*B29C 48/00* (2019.01)
*C08K 3/04* (2006.01)
*C08K 5/3435* (2006.01)
*B29C 48/28* (2019.01)
*B29C 55/02* (2006.01)
*B29L 31/00* (2006.01)
*B29C 48/08* (2019.01)
*B32B 27/22* (2006.01)
*B29C 48/88* (2019.01)
*B29K 23/00* (2006.01)
*B29L 7/00* (2006.01)
*B29L 9/00* (2006.01)

(52) U.S. Cl.
CPC ............ *B29C 55/023* (2013.01); *B29C 55/06* (2013.01); *B32B 27/08* (2013.01); *B32B 27/18* (2013.01); *B32B 27/32* (2013.01); *B32B 27/327* (2013.01); *C08J 5/18* (2013.01); *C08K 3/04* (2013.01); *C08K 5/3435* (2013.01); *B29C 48/0018* (2019.02); *B29C 48/0019* (2019.02); *B29C 48/08* (2019.02); *B29C 48/914* (2019.02); *B29C 2791/007* (2013.01); *B29K 2023/0625* (2013.01); *B29K 2995/0049* (2013.01); *B29L 2007/002* (2013.01); *B29L 2009/00* (2013.01); *B29L 2031/70* (2013.01); *B32B 27/22* (2013.01); *B32B 2264/108* (2013.01); *B32B 2307/30* (2013.01); *B32B 2307/514* (2013.01); *B32B 2307/54* (2013.01); *B32B 2307/71* (2013.01); *B32B 2307/7242* (2013.01); *B32B 2410/00* (2013.01); *C08J 2323/08* (2013.01); *C08K 2201/005* (2013.01); *Y02P 60/12* (2015.11)

(58) Field of Classification Search
CPC . B32B 2307/516; B32B 2410/00; C08K 3/04; C08L 23/0815; C08L 2314/06; C08L 23/18; C08L 23/20; C08L 23/22; B29C 55/06; B29C 55/065; B29L 2031/70; B29K 2105/0041; B29K 2307/04; B29K 2507/04; A01G 3/0275
See application file for complete search history.

(56) References Cited

U.S. PATENT DOCUMENTS

| | | | |
|---|---|---|---|
| 4,343,767 A * | 8/1982 | Long | G01N 30/64 204/294 |
| 4,436,888 A | 3/1984 | Copple | |
| 5,292,561 A | 3/1994 | Peiffer et al. | |
| 5,300,353 A * | 4/1994 | Yoshimura | B32B 27/08 428/213 |
| 5,709,932 A | 1/1998 | Glez et al. | |
| 5,993,942 A * | 11/1999 | Bakker | B29C 65/1445 215/246 |
| 6,168,840 B1 | 1/2001 | Johnstone | |
| 6,291,037 B1 | 9/2001 | Bakker et al. | |
| 6,383,430 B1 | 5/2002 | Johnstone | |
| 7,959,995 B2 * | 6/2011 | Ishii | B29C 61/003 428/34.9 |
| 8,541,077 B2 | 9/2013 | Patel et al. | |
| 9,333,699 B2 | 5/2016 | Linkies | |
| 9,358,760 B2 | 6/2016 | Huyghe | |
| 9,505,195 B2 | 11/2016 | Masaki et al. | |
| 10,023,359 B2 | 7/2018 | Mitchell et al. | |
| 10,040,261 B2 | 8/2018 | McLeod et al. | |
| 10,232,594 B2 | 3/2019 | Mitchell et al. | |
| 10,239,294 B2 | 3/2019 | Mitchell et al. | |
| 10,406,786 B2 | 9/2019 | Mitchell et al. | |
| 2002/0136848 A1 | 9/2002 | Yoshii et al. | |
| 2006/0110616 A1 | 5/2006 | Davis | |
| 2006/0115615 A1 | 6/2006 | Schultz et al. | |
| 2006/0280923 A1 * | 12/2006 | Fleck-Arnold | C08L 23/0815 428/220 |
| 2008/0118692 A1 | 5/2008 | McLeod et al. | |
| 2009/0056209 A1 | 3/2009 | Baciu et al. | |
| 2010/0040875 A1 | 2/2010 | Patel et al. | |
| 2011/0123802 A1 * | 5/2011 | Chang | B32B 7/02 428/394 |
| 2014/0186606 A1 | 7/2014 | Bower et al. | |
| 2014/0208695 A1 | 7/2014 | Mitchell | |
| 2016/0136935 A1 | 5/2016 | Mitchell et al. | |
| 2016/0174473 A1 | 6/2016 | Toye et al. | |
| 2017/0174379 A1 | 6/2017 | Mitchell et al. | |
| 2017/0182750 A1 | 6/2017 | Lee et al. | |
| 2017/0260375 A1 * | 9/2017 | Leano | B29C 48/21 |
| 2017/0368804 A1 | 12/2017 | Mitchell et al. | |
| 2017/0368811 A1 | 12/2017 | Mitchell et al. | |
| 2018/0215127 A1 | 8/2018 | Mitchell et al. | |
| 2018/0235159 A1 | 8/2018 | Chao | |
| 2018/0304525 A1 | 10/2018 | Yoshida et al. | |
| 2019/0001649 A1 | 1/2019 | Mattsson | |

FOREIGN PATENT DOCUMENTS

| | | | | |
|---|---|---|---|---|
| JP | 56166024 A | * | 12/1981 | |
| JP | S57-066928 A | | 4/1982 | |
| JP | S61-160222 A | | 7/1986 | |
| JP | H06-130228 A | | 5/1994 | |
| JP | S62-265927 A | | 11/1997 | |
| JP | 2000-509283 A | | 7/2000 | |
| JP | 2005-237225 A | | 9/2005 | |
| JP | 2007-124986 A | | 5/2007 | |
| JP | 2014233274 A | * | 12/2014 | ............ B32B 27/08 |
| KR | 20-0293484 Y1 | | 10/2002 | |
| WO | 1996/006722 | | 3/1996 | |
| WO | 1996/007699 | | 3/1996 | |
| WO | 1997/041721 | | 11/1997 | |
| WO | 1998/051474 | | 11/1998 | |
| WO | 2013/156533 A1 | | 10/2013 | |
| WO | 2015004316 | | 1/2015 | |
| WO | 2017108891 A1 | | 6/2017 | |
| WO | 2017112886 A1 | | 6/2017 | |
| WO | 2017210403 A1 | | 12/2017 | |
| WO | 2018096480 A1 | | 5/2018 | |
| WO | 2018236991 A1 | | 12/2018 | |

OTHER PUBLICATIONS

JPO Machine translation of JP-56166024-A, published Dec. 1981. (Year: 1981).*
Machine translation of JP2014-233274A, published Dec. 2014. (Year: 2014).*
Written Opinion of the International Searching Authority in corresponding application No. PCT/AU2016/050694, dated May 10, 2016.
Tiffany Maughan et al., Use of Plastic Mulch for Vegetable Production, Utah State University Extension, Horticulture/Vegetables/2016-01, pp. 1-6.
Mathieu Ngouajio, Heat injury with plastic mulches, Michigan State University, MSU Extension, Department of Horticulture, May 31, 2006, 3 pages.
English Office Action related to Japan Patent Application No. 2019-512024 dated Jul. 17, 2020, 3 pages.
Office Action received for KR Patent Application No. 10-2018-7035702 dated Aug. 27, 2021, 21 Pages included English Translation.

* cited by examiner

SOLAR-REACTIVE MULCH FILM

CROSS REFERENCE TO RELATED APPLICATIONS

The present application is a national-phase entry from PCT Patent Application No. PCT/AU2016/050694, filed Aug. 2, 2016, which in turn claims priority to Australian Patent Application No. 2016/901723, filed May 10, 2016, both of which are incorporated herein by reference.

FIELD OF THE INVENTION

This invention relates to agricultural sheet mulches, in particular, but not exclusively to a pre strained mulch film that shrinks in surface area as opposed to expanding as does prior art mulch film when exposed to solar radiation including methods of its use and manufacture.

BACKGROUND OF THE INVENTION

Although prior art packaging film is a very different product to agricultural mulch film, some initial discussion as to understanding and appreciating the differences between the two products is useful.

Prior art heat shrink films have been designed for clear packaging film and are not suitable for use as a mulch film. Linear low density or high density polyethylene does not shrink by a significant amount when post heated. Prior art industrial heat shrink film that has not been post extrusion orientated will expand in surface area, as it is heated up, prior to reaching the melting point temperature where it shrinks to contain the load. The majority of prior art shrink film is manufactured with the purpose of being used as bundle collation shrink wrap which requires different properties to those required for heat shrink mulch film. Further, normal industrial heat shrink film has to be raised to temperatures above the melting point of the film which is approximately 110 to 120 degrees Celsius in order to achieve shrinkage.

Film able to shrink in surface area by up to 25% at temperatures as low as 40 to 55 degrees Celsius is hitherto unknown for polyethylene films. The low temperature required and the high level of shrinkage that can be achieved using the present invention make this film ideal for outdoor mulch film.

U.S. Pat. No. 3,891,737A teaches that common heat shrink films need to be heated above the polymers melting point in order to achieve a useful amount of shrinkage. Film made according to this patent is only stretched at a ratio between 1.2:1 and 1.3:1; further this film is annealed whilst hot. This shrink film is designed to shrink in a heat tunnel or hot air gun and not when exposed to solar radiation in an outdoors application.

U.S. Pat. No. 4,436,888A teaches that shrink film made according to this patent requires a temperature of 124 to 138 degrees Celsius and the manufacturing procedure involves a double stretching process which includes annealing and hot temperatures.

U.S. Pat. No. 4,277,594 teaches a method of manufacture that involves a double stretching process involving both machine direction orientation as well as transverse stretching producing a film that is annealed at high temperature. This film is designed to wrap articles as a packaging film and is not suitable for external outdoor use.

U.S. Pat. No. 5,292,561 teaches a method of manufacturing a film designed to produce labels for bottles not for agricultural mulch films.

U.S. Pat. No. 5,709,932 teaches a film which is designed to shrink at 120 degrees Celsius which is therefore not suitable for use as agricultural mulch film.

US20100040875 A1 This document was referred to as being of particular relevance when a section 15/5 International Type Search was conducted and completed on 23 Jun. 2016 on priority document patent application 2016901723. Thus this document is specifically addressed in detail.

This document identifies a common knowledge, major problem occurring with agricultural mulch films i.e. the film expands in the sun and consequently flaps in the wind.

This document proposes a possible solution to the identified problem i.e. having the film shrink when exposed to sunlight as opposed to expanding.

However the properties of the film described to achieve this solution are such as to be detrimental to practical and useful agricultural mulch to the extent where the film produced will not be able to be used as a machine laid mulch film.

To achieve this shrinking property this patent advises a method of manufacture having multiple stripes across the film each extensively stretch thin in the cross ways direction only and each running the entire longitudinal length of the film.

However, a person skilled in the art of laying and using mulch films will note that the film manufactured according to this patent will not function as a practical mulch film in a commercial agricultural environment.

A person skilled in the art of film extrusion and mulch film manufacture will also note aspects of the film that will prevent it from being suitable for use as mulch film.

The reasons why this film will fail are listed below in summary form:

a. This film is stretched in strips only in the transverse cross web direction creating multiple stripes of thick and thin film arranged across the width of the web and running the entire length of the web.

b. It has consequent multiple stripes of weak and strong film across the web; the mulch film will degrade quicker along the thin stripes in an outdoor environment; the mulch film will split along the weak lines when being applied to the bed by machine or when being lifted by machine from the bed at the end of the season.

c. the only cross wise elongation of the film will further make the film weaker in the lengthwise direction which is the direction of extraction from the soil.

d. The film will tend to pull narrow and be difficult if not impossible to roll up as an even width roll over the many hundreds of layers; when unwinding the film it will tend to pull narrow and thus pull out of the tuck wheels; when laid and stretched in a sideways direction by the tuck wheels the film will tend to split along the thin stretched strips.

e. The roll of film will have high circumferential bands which will cause holes upon application by machine.

f. The film will tend to split when holes or cuts are placed in it to plant seedlings; the sideways shrinkage will accentuate the possibility of splitting when degraded or when cuts are made in the film.

g. Some strips of the film are not stretched at all; the un-stretched strips will not shrink and may actually counter the stretched areas shrinkage by expanding e.g. table 1.

h. The thin areas will not block light allowing weeds to germinate and will have less chemical protection against degradation by UV light and less black pigment to absorb solar energy and protect the film.
i. The experiments conducted in table 1 indicate very poor shrinkage levels and at temperatures under 60° C. no shrinkage but some expansion; these tests were carried out using a laboratory heat source with no evidence provided that the film will shrink using solar energy alone, this is left to presumption and assumption.
j. The above points are assumed from the discussions, suggestions and presumptions made in this document as no specific claims are made as to the ability of the film to shrink or to act as an agricultural mulch film.

Below are listed some of the innovative and inventive aspects presented in this current application which make the material employed a proven and successfully tested solar heated, shrinking agricultural mulch film and differentiate it from the unsuccessful material described above:

a. The sheet is strained in the longitudinal direction only.
b. The sheet has a uniform thickness over the entire surface area with no thin or weak strips.
c. The sheet may have high and consistent levels of carbon black to generate solar heat, prevent weed growth and protect the polymer from UV light degradation.
d. The sheet has improved tensile properties in the longitudinal direction which assist in maintaining a solid sheet when being lifted from the ground.
e. The material is strained while heated and immediately chilled while having the strain maintained so as to lock in the shrinking forces in the material, allowing the mulch to shrink at very low temperatures normally experienced in a field 45° to 70° C.
f. The sheet shrinks majorly in the lengthwise direction with slight but sufficient shrinkage in the transverse direction, evenly over the entire surface area, without creating weak lines or placing tearing stress on plant cuts and holes.
g. The rolls are of an exact and even width and dispense as a flat sheet on application.
h. The method of manufacture and consequent physical properties is completely different.

Specifically, prior art agricultural plastic mulch film comprises two main types. Plastic sheet mulch is a unique product that is designed to perform under some of the most difficult weather conditions encountered by any agricultural product.

The first type is generally relatively transparent and designed for short term use to warm the soil and promote early germination of seeds. The second type is opaque and designed to enhance growing conditions, as is described below, for the entire growing season.

What differentiates plastic mulch film from any other plastic product such as bundle heat shrink film or pallet stretch wrap or other plastic film includes the following properties:

a) It has to perform the specific functions of warming soil, conserving water, preventing soil erosion, protecting fruit, preventing weed growth, surviving for a complete growing season outdoors and having adequate strength to be laid and lifted to and from the growing soil bed by mechanical means.
b) It has to be generally thin to conserve polymer usage so as to reduce cost and is normally between 15 and 40 microns thick the most commonly 25 microns thick.
c) It has to block virtually all light transmission to prevent weed growth.
d) It has to be able to have a silver or light coloured surface to reflect light to minimise soil temperatures.
e) It has to resist degradation by ultra violet light so as to be lifted from the soil at the end of the growing season by mechanical means.
f) It has to remain intact for up to 12 months or more, if the farmer decides to grow a second crop on the field without lifting the mulch, while exposed to all outdoor aspects of an agricultural environment including wind, rain, direct sunlight, hot conditions, frozen conditions, animal movement, machinery movement, and soil settling.
g) It has to resist degradation from agricultural chemicals sprayed on the crop.
h) Even though it is a thin sheet it has to be strong enough to be laid onto a growing bed and have a portion of the film buried under soil by mechanical means.
i) It has to be strong enough to be applied to a bed and buried while under substantial tension so as to be laid tautly against the bed in to prevent flapping and lifting in the wind.
j) Due to the style of machines used to lay the mulch film it has to have a uniform roll profile because any raised regions across the roll can result in the mulch being damaged as the film unwinds on the machine.
k) It has to resist splitting and tearing when holes or slits are cut into the film to plant seeds or seedlings in the underlying soil.
l) It has to retain sufficient strength so as to be lifted from the ground at the end of the growing season by mechanical means without disintegrating. Any plastic film remaining in the soil after removal can be detrimental to future crops grown on the same ground.

Growing crops using plastic mulch film also has several advantages:

a) The mulch can be coloured in order to control the temperature of the soil. Black mulch film will warm the soil around a seedling allowing for early growth whereas white mulch film will not heat the soil as much and is effective particularly in hot climates.
b) White mulch reflects a greater amount of light up into the plant which accelerates growth and development.
c) When combined with a drip irrigation system under the mulch, the amount of water received by the plant can be accurately controlled and reduced.
d) Water evaporation around the plant is reduced thereby also reducing overall water consumption.
e) When using a dripper system the plant may also be fed fertilizer and other supplements to assist with growth. The amount of fertilizer applied to the plant can be reduced as the mulch film also contains the spread of the fertilizer.
f) When mulch film is made to be completely opaque by having a dense black layer, it restricts the growth of weeds. Weed seedling do not receive any light for photosynthesis and die shortly after germinating.
g) For plants with ground resting fruit such as strawberries, melons, cucumbers, pumpkins, etc., the plastic mulch protects the fruit from damage by contact with the soil and animals living in the soil. These fruits are also kept clean by being grown on plastic rather than in contact with the soil.
h) Mulch film also prevents the loss of tilled soil through wind and water erosion.

The vast majority of standard sheet mulch is made from linear low density polyethylene (LLDPE), often blended or coextruded with metalocene catalysed LLDPE, a long chain polymerised molecule made from ethylene derived from the petrochemical industry. These modern high performance polymer materials have assisted in improving the strength of the film allowing the reduction in the thickness of the mulch film.

Carbon black particles are used to colour the film which absorbs most of the light striking the plastic. This prevents UV light from reaching the polymer molecules where the light energizes a catalytic schism of the molecules. This ultimately results in shortening the molecules to such an extent that the whole film becomes brittle causing it to break into fragments.

As a finished product polyethylene mulch film contains, in addition to high levels of colour additive, many types of chemicals designed to protect the plastic. These include chemicals to counter exposure to heat during the manufacturing process; from the degrading elements of the environment in which it is used, such as UV absorbers, UV stabilizers, and anti-oxidants; processing aids and light absorbers, as well as components to increase opacity or increase light reflection. All of these are designed to extend the life of the plastic sufficient for easy collection and recovery at the end of its useful life.

The use of high technology polymers and the substantial addition of protective additives make the overall polymer mix of agricultural mulch films extremely expensive when compared to polymers films commonly used for packaging. Any method of reducing the thickness of the film and thus saving raw materials is of benefit to the farmer. Sheet mulch thinness must be balanced against the retention of sufficient tensile strength to allow it to perform adequately.

Prior art mulch film is usually made with a dense black colour or if the upper surface is white, the under layers will be black. This causes the film to heat up when exposed to solar radiation. As the film heats up in the sun, it expands and the sheet becomes loose on the bed.

Clear mulch film will heat the soil and consequently the air trapped between the soil and the film. This heat can heat the air and consequently heat the mulch film which can then expand.

Loose mulch film can billow and flap about in the wind. As it does so, it can damage seedlings, which are planted in holes or slits cut into the film. Should the film flap upwards to a height above that of the seedling and then flap downwards, the hole cut for the seedling may not return to its original position and the film may crush the seedling.

It has been reported that in some areas of high wind more than 10% of seedlings are damaged in this way. It can be an extremely costly and difficult exercise in replacing the seedlings.

The force of wind driven flapping can be powerful enough to lift and drop young fruit laying on the sheet mulch causing bruising and other damage to the crop.

Flapping plastic can also rub against the stem of a plant and cause damage to it.

This additional movement and continued flexing of the plastic sheet can also accelerate molecular break down in the mulch film with consequent early degradation and disintegration.

Several attempts have been made to find a solution to the damage of crops due to mulch film expanding in the heat of the sun and consequently flapping in the wind including:

1. Mulch film is usually laid onto the bed by mechanical means having a mulch laying machine drawn behind a tractor. This laying machine normally forms the shape of the bed, places the film onto the bed and holds it in place using side tuck wheels while fixed ploughs dump soil onto the side edges of the film to hold it permanently in place. One solution in an attempt to have the film hug tightly to the soil especially if a raised growing bed is used, has been to lay the film on the bed under tight tension by using a brake on the roll as it is unwound with the tuck wheels placed at an outward angle to the direction of the laid plastic being laid.
2. Prior art mulch film can be made by a cast film process wherein the sheet is micro-embossed with a small dimpled or diamond pattern. When the sheet is laid under tension the indented pattern is flattened and pulled out of the sheet giving it a smoother surface. As the sheet heats up during the day, the embossed indentations retract deeper, to keep the sheet taut even though it has previously expanded. During the night or cool temperatures, the embossed indentations in the plastic are again pulled flat as the sheet contracts.
3. Farmers will try to lay the mulch film during the heat of the day so as to try to ensure that the film is hot when laid.
4. Some farmers try to solve this problem by using a thicker film which is more rigid and can be laid tighter.

Each of the above attempts to resolve the film flapping problem have, on occasion, been unsuccessful due to the following reasons:

a) In regard to prior art solution 1, the high level of tension used can create problems with maintaining the film under the tuck wheels should there be any variation in thickness across the width of the film. This can result in the film moving out of line with the wheels.

Due to the film being under high stress any imperfection can result in a tear or split. If the film is laid under too high a stress it can be stretched thin by the wheels and thus create an area where the film will not have sufficient body to last the complete season.

If laid in low temperatures the film can have a tendency to split under the pressure of the tuck wheels thus delaying the process.

The laying process has to be performed slowly due to the risk of the film splitting or moving out from under the tuck wheels.

Many farmers use casual labour who may not be skilled in the art of laying mulch film under tension and thus the laying process is slowed.

The mulch film will expand when it heats up and will still have some degree of flapping regardless of how tight it is laid.

In respect of prior art solution 2, the embossing process may help keep the sheet on the surface of the bed in light winds but, because it is a temporary shrinkage, the film will expand in the heat of the sun and the embossing recovery often does not have sufficient strength to overcome the lifting effects of strong winds.

This is particularly where raised beds are used and the air travelling over and across the curved surface of the bed creates a considerable aerodynamic force sufficient to lift the plastic.

b) In respect of prior art solution 3, laying film during the heat of the day helps a little as the film has expanded slightly due to the ambient temperature but temperatures experienced lying flat under solar radiation are far greater than at time of laying and the film expands considerably on exposure to direct sunlight.

It is not always possible to lay the film under sunny conditions due to other environmental conditions at the time of laying.

c) In respect of prior art solution 5, thicker film adds to the cost of the product both in the amount of polymer and additives used but also in terms of transport costs. Handling costs of heavier rolls and disposal charges of transport and landfill tipping costs are also increased. Thicker film will still expand when heated by solar radiation and may actually create more damage when it rubs or strikes a crop plant.

It is a general object of the invention to ameliorate some or all of the above problems incurred with the prior art by providing a novel and inventive mulch film that when exposed to direct sunlight, shrinks rather than expands as does existing plastic mulch sheet and which can be used with existing mulch laying technology and which will prove to be functionally and economically competitive with prior art mulch films.

It is a specific objective to provide a mulch which can be laid, by mechanical means, under normal conditions wherein on exposure to sunlight, shrinks to a maximum extent permitted by buried portions of the sheet, so as to take the form of and remain taut against the growing bed thereby preventing the wind from flapping the mulch with possible consequential damage to young seedlings.

Other specific objectives include the provision of methods of manufacturing and of using the invention.

The inventive step provided by this invention is to provide an agricultural mulch film that successfully overcomes the problem of prior art agricultural mulch film expanding when heated by sunlight. This problem of expansion under the effects of solar energy is unique to mulch film and does not occur with any other type of film or sheet. This problem often prevents mulch film from performing its objective as a specialized agricultural product designed to protect a crop.

The problem has been identified by prior art and numerous attempts have been made to alleviate such problem, however all have been unsuccessful.

The mulch film according to this invention has been subjected to longitudinal elongation while maintained at an elevated temperature and then immediately cooled thus locking into the plastic material the elongation stresses contained by the elongated polymer molecules.

Uniquely the mulch film shrinks in total exposed surface area once the material has been softened by heating when exposed to solar radiation thus enabling the stretched molecules to retract towards the pre-stretched position.

Unexpectedly, the shrinkage of the mulch film commences at temperatures as low as 40° C.

Upon shrinking the film consequently tightens along and across an agricultural growing bed, when placed by mechanical means to a bed and exposed to direct sunlight, overcoming the problem of expansion. No other product performs this function or successfully provides the unique benefits of a shrinking mulch film.

The present invention of a solar powered, shrinking mulch film, is novel in that it proposes a proven solution to a problem that affects the use of mulch film sheets, such problem being the expansion of the sheet when exposed to sunlight.

The problem has been identified by prior art and numerous attempts have been made to alleviate such problem, however all have been unsuccessful.

The unique mulch film, incorporating the properties provided by the present invention and the described manufacturing parameters and methods is novel and solves the problem of agricultural mulch film expanding in surface area when heated by the sun by having the property of shrinking in exposed surface area at temperatures achievable when the film is heated in a field by solar energy, while maintaining all other chemical and physical properties required for a successful agricultural mulch film.

Even though the possibility of having mulch film shrink when exposed to sunlight has, in the past, been envisioned as a solution to the problem, the mulch film manufactured according to this invention provides a unique functional and practical working embodiment that provides a mulch film that does not expand but rather shrinks when exposed to solar radiation whilst performing all other functions required of an agricultural mulch film.

This invention is novel and no other similar successful method of solving the problem exists, that is, being able to successfully lay the mulch film by mechanical means, have it maintain its integrity for a full growing season and then successfully retrieving the film from the soil while relying on the mulch film itself to shrink in sunlight and not expand as expected.

SUMMARY OF THE INVENTION

In one aspect, the invention resides in a solar reactive sheet of agricultural mulch film comprising: one or more sheets of one or more layers of heat shrink material, each sheet having uniform thickness and which has undergone treatment by a mechanical process wherein the material is elongated longitudinally at an elevated temperature and subsequently cooled; such process augmenting shrinkage at low temperatures, whereby shrinkage of the material is ensured when the temperature of the material is elevated by exposure to solar energy.

Preferably, the one or more layers of heat shrink material is evenly pre-strained longitudinally at a predetermined temperature and tension to beyond the yield point of the material by a machine direction orientation process; the pre-strained one or more layers thereafter cooled having reached a predetermined level of yield, wherein resultant molecular deformation stresses are thus retained in the material, facilitate shrinkage, but not expansion in one or more directions on exposure to solar radiation;

Preferably, the one or more layers of heat shrink material is pre-strained longitudinally at ambient temperature and tensioned to beyond the yield point of the material; the pre-strained one or more layers retained at ambient temperature wherein resultant molecular deformation stresses which are thus retained in the material, facilitate shrinkage, but not expansion in one or more directions on exposure to solar radiation More preferably, the one or more layers of heat shrink material is evenly pre-strained longitudinally at a predetermined temperature and tension to beyond the yield point of the material; the pre-strained one or more layers immediately cooled having reached a predetermined level of yield, wherein resultant molecular deformation stresses which are thus retained in the material, facilitate shrinkage, but not expansion in one or more directions on exposure to solar radiation.

Preferably the longitudinal pre-straining of the one or more layers of heat shrink material also increases its tensile strength to enable its machine handling by mechanical apparatus to reduce any tendency to tear when laid or leave behind shredded residue when removed by mechanical apparatus.

More preferably longitudinal pre-straining of the one or more layers of heat shrink material also increases its tensile strength to enable it to be produced at a thinner gauge and still perform satisfactorily.

The low temperature shrinking ability of the one or more layers of heat shrink material allows the sheet to be made thinner and laid faster at a lower laying tension, but thereafter shrinks so as to prevent flapping in the wind.

Preferably, the side edges of adjacent sheets are overlaid on top of each other.

In the alternative, the side edges of adjacent sheets are joined together.

Preferable the heat shrink material is a plastic film that increases in temperature when exposed to solar energy and as a consequence, softens and allows molecular movement thus releasing any pre-strained shrinking properties.

Preferably the heat shrinkable plastic film is preferably either a single wound sheet or a bonded and blocked, double wound sheet so bonded as to form a single sheet, comprised of at least two layers of polyolefin polymer.

Preferably, the heat shrinkable plastic film is manufactured by a co-extrusion blown or cast film extrusion process and which has undergone, post extrusion, in-line or off-line stretching in a lengthwise direction by a modification of a process known as machine direction orientation (MDO).

Preferably the machine direction orientation process incorporates heated infeed nip rollers and chilled outfeed nip rollers rotating at different lineal speeds wherein molecular stresses are trapped in the sheet while under full stretching strain.

Preferably, the sheet is not subjected to any form of post extrusion process designed to de-stress the sheet such as by hot annealing or other form of direct stress relaxation or stabilization of the shrinking forces entrapped in the plastic following the stretching process and prior to winding it up onto a spool; the shrinking stresses trapped in the film during the manufacturing process are such that the film will suitably shrink by approximately 10% to 30% in surface area, if unrestrained, at a temperature as low as 55 degrees Celsius, such shrinkage commencing once the film reaches 40 degrees C., even though the melting point for the polymer may be very much higher, at around 110 to 120 degrees Celsius, for example, for polyethylene.

Preferably the sheet is subjected to a post orientation relaxing process to fully de-stress or pre relax the sheet from residual elastic forces, created by stretching the sheet below the yield point, prior to winding the sheet onto a spool More preferably the sheet may be wound onto the spool using low winding tension or gap winding technology so as to allow any residual elasticity in the sheet to be dissipated.

Preferably the one or more layers of heat shrink material comprises at least one layer of a polyolefin polymer combined with additives to ensure long lifespan of the mulch film and which includes process aids, anti-oxidization additives, HALS type ultra violet light stabilizers, UV light absorbers, plasticizers and lubricants.

Preferably the polyolefin polymer is polyethylene.

Further preferably the polyolefin polymer is linear low density polyethylene.

Preferably the polyolefin polymer is metalocene linear low density polyethylene.

Preferably the polyolefin polymer is a blend of linear low density polyethylene and metalocene linear low density polyethylene.

Preferably the heat shrink material consists of at least two or more co-extruded layers.

Preferably the one or more layers of heat shrink material is impermeable to gases.

Preferably at least one of the one or more layers of heat shrink material contains between 2% and 8% of carbon black particles of between 17 and 100 nanometres in size.

Preferably at least one of the one or more layers of heat shrink material contains between 4% and 7% of carbon black particles of between 17 and 50 nanometres in size.

Preferably at least one of the one or more layers of heat shrink material contains between 5.6% and 6.4% of carbon black particles of between 17 and 21 nanometres in size.

Preferably the solar radiation absorbed by the sheet causes the temperature of the film to rise above 45 degrees Celsius.

Preferably the film includes HALS type Ultra Violet light protection.

Preferably the sheet consists of different colours on either surface wherein at least one of the one or more layers of heat shrink material is black in colour to ensure the sheet blocks all light transmission and absorbs sufficient solar energy to heat the sheet to initiate shrinkage of the material.

Preferably the sheets adapted to be laid, by mechanical means, lengthwise over longitudinal growing beds; each sheet held tautly over the bed by burying its side edges in soil, and wherein contemporaneous shrinkage of the sheet in combination with the weight of the soil, maintains tautness of the mulch film over a growing period.

In another aspect, the invention resides in a method of manufacturing the mulch film as hereinbefore described by a blown film process including the steps of:
(a) heating and melting polymer in an extruder;
(b) extruding the melted polymer through a circular die;
(c) drawing the extruded polymer upwards as a bubble;
(d) cooling and solidifying the collapsed tube by a cooling air ring;
(e) collapsing the bubble into a tubular configuration through a set of collapsing boards;
(f) passing the collapsed film tube as a double sheet, through an in-line, machine direction orientation) apparatus employing heating and cooling rollers rotating at different speeds thereby stretching the film;
(g) passing the film through a printing station where planting lines are printed onto the film;
(h) trimming away the edges of the film to ensure the sheet is of substantially uniform thickness across its width, and
(i) rolling the film onto a spool.

In another aspect, the invention resides in a method of manufacturing the mulch film as hereinbefore described by a cast film extrusion process including the steps of:
(a) heating and melting polymer in an extruder;
(b) extruding the polymer through a flat die;
(c) passing the flat extruded film onto chilled rollers wherein it cools and solidifies;
(d) passing the solid film through an in-line, machine direction orientation apparatus employing heating and cooling rollers rotating at different speeds thereby stretching the film;
(e) passing the film through a printing station where planting lines are printed onto the film;
(f) trimming away the edges of the film to ensure the sheet is of substantially uniform thickness across its width, and
(g) rolling the film onto a spool.

Preferably, the film is extruded initially thicker than is required prior to passing through the machine direction orientation apparatus wherein it is drawn narrower and thinner while retaining substantially the tensile properties of the in-fed thicker film.

Preferably the film is stretched by the machine direction orientation apparatus while at a temperature of between 20 and 120 degrees Celsius at the start of the stretching process.

Preferably, the film is heated to between 40 and 90 degrees Celsius at the start of the stretching process.

More preferably, the film is heated to between 60 and 70 degrees Celsius at the start of the stretching process.

Preferably, the film is cooled to between 10 and 40 degrees Celsius immediately after the film has been stretched by the machine direction orientation apparatus and while stretching stresses are retained in the film.

More preferably, the film is cooled to between 15 and 20 degrees Celsius immediately after the film has been stretched by the machine direction orientation apparatus and while stretching stresses are maintained in the film.

Suitably, the resultant molecular stresses of stretching by the machine direction orientation (MDO) process is maintained in the film while it cools.

Preferably the film is not subject to any specific relaxation or annealing process after being stretched.

Preferably the elastic stresses retained in the film caused by the film being heated, stretched and chilled are released when the film reaches a temperature of 40 and 60 degrees Celsius causing the film to shrink in surface area sufficient to tighten the film onto the growing bed.

Preferably, an infeed nip roller of the machine direction orientation apparatus is rotated at the same surface linear speed as haul off nip rollers employed during the extrusion process.

Preferably, an outfeed nip roller of the machine direction orientation apparatus is rotated to yield a surface linear speed of between 1.25 and 10 times the linear speed of an infeed nip roller.

In a more preferred version, an outfeed nip roller of the machine direction orientation apparatus is rotated to yield a surface linear speed of between 1.5 and 3.5 times the linear speed of an infeed nip roller.

Alternatively, depending on the stretch required, an outfeed nip roller of the machine direction orientation apparatus is rotated to yield a surface linear speed of between 2 and 3 times the linear speed of an infeed nip roller.

Preferably, planting lines are printed longitudinally along the centre of the film.

Preferably, the edge trimmings are recycled back into the extruders and blended with polymers contained therein.

Preferably, the film is split into two separate sheets and rolled onto a spool to a required length.

In yet another aspect, the invention resides in a method of using the mulch film as herein before described including the steps of:
(a) laying one or more sheets of mulch film on a crop growing bed;
(b) burying opposite side edges of the one or more sheets under soil, wherein each sheet is held tautly over the surface of the bed;
(c) subjecting exposed portions of the one or more sheets to direct sunlight,
(d) thereby causing the film to shrink in both longitudinal and transverse directions; whereby in combination and co-operation with the weight of soil over the buried edges,
(e) tautness of the mulch film is maintained over the growing period.

BRIEF DESCRIPTION OF THE DRAWINGS

In order that the invention be better understood and put into practical effect, reference will now be made to the accompanying drawings wherein.

BEST MODE FOR CARRYING OUT THE INVENTION

Figure 1:
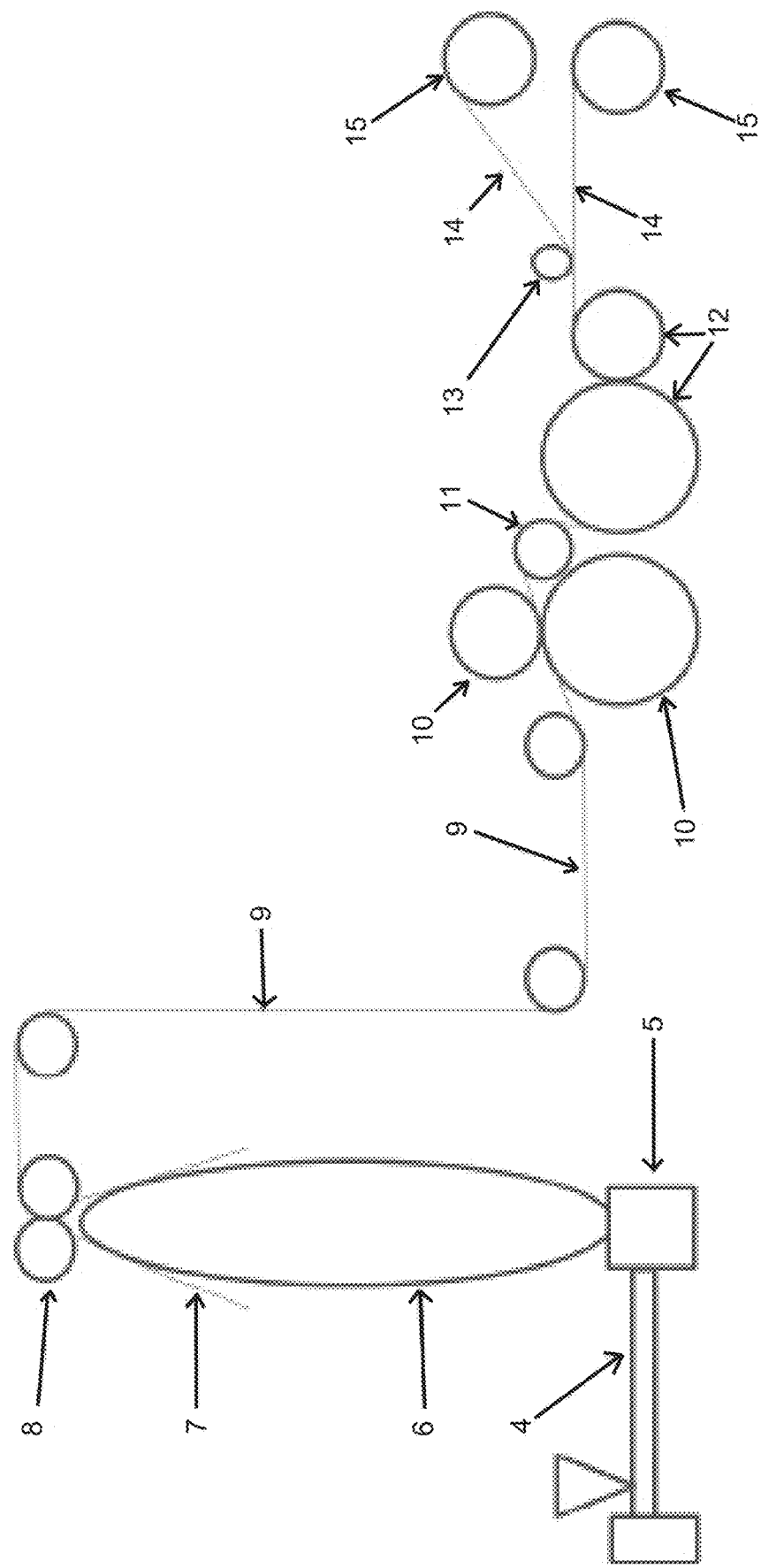
FIG. 1 shows film sheet formed by the blown film process according to the invention.
Figure 2:
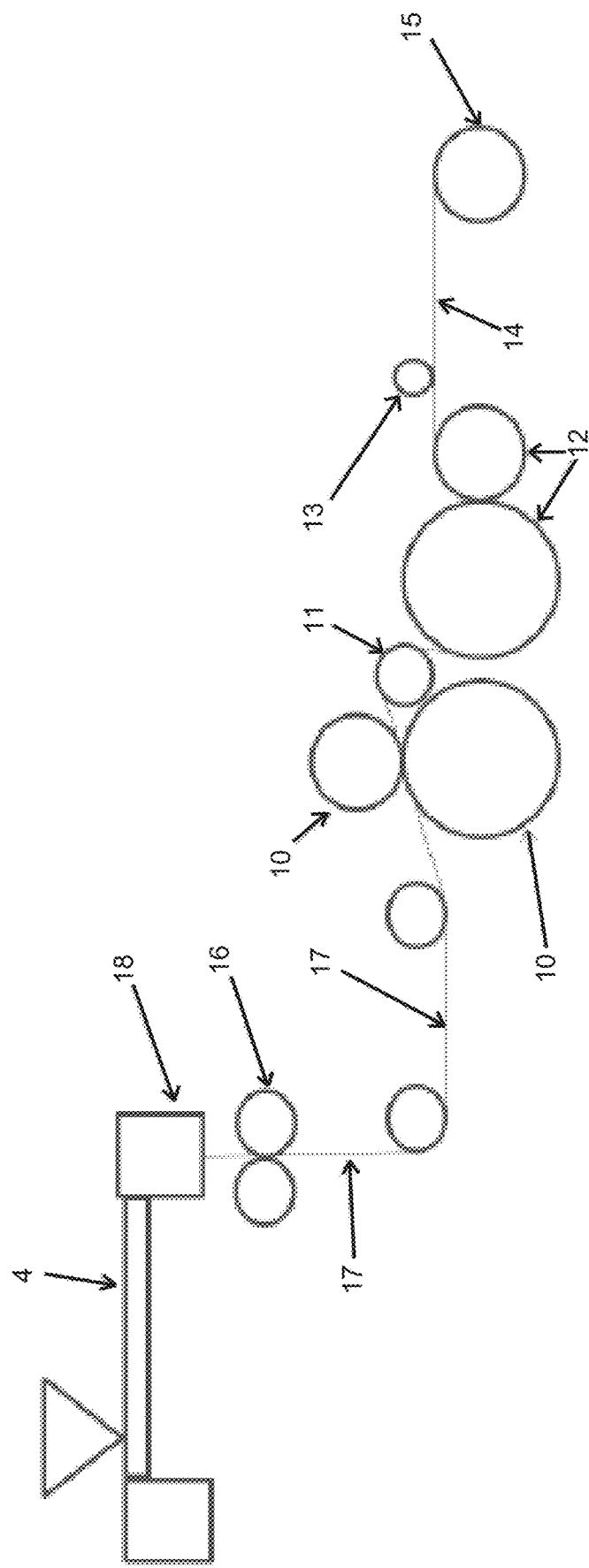
FIG. 2 shows film sheet formed by the cast film extrusion process according to the invention.

Reference is made to FIG. 1 and FIG. 2 indicated by numerical reference in parenthesis in the text. Throughout the detailed description, numbers referring to the same components in different drawings will be kept likewise identical where possible and only varied where the context and avoidance of ambiguity call for a change in the enumeration.

The process of manufacturing heat shrink mulch according to the blown film process is shown in FIG. 1. This involves polymer being heated until melted in an extruder (4), or multiple extruders, and extruded through a circular die (5). The film is drawn upwards as a bubble while being cooled to a solid state by the cooling air ring (6) and is passed through a set of collapsing boards (7) by a first set of top nip rollers (8). The film travels further along the line as a double sheet or collapsed tube (9).

Alternatively, the film may be extruded by the process known as a cast film extrusion shown in FIG. 2 wherein the polymer is heated and melted in an extruder or multiple extruders and formed as a co-extruded sheet. The polymer is extruded via a flat die (18) onto chilled rollers (16) to produce a single sheet of mulch film (17).

The polymer making up the film may consist of either low density polyethylene or high density polyethylene or linear low density polythene or metalocene linear low density polyethylene or blends thereof. The polymer is extruded either as a mono layer or a multilayer co-extrusion and will have at least one layer contain high levels of carbon black particles—for example 14% to 16% of carbon black master batch containing 40% of 17 to 25 nanometre size particles of carbon black.

The polymer blend making up the mulch film suitably contains additives to ensure a long lifespan of the mulch film such as process aids, anti-oxidization additives. HALS type ultra violet light stabilizers. UV light absorbers, plasticizers and lubricants.

Subsequent to exiting the top nip rollers of the blown film line or exiting the chilled casting rollers of the cast film line the mulch film is passed through an in-line, machine direction orientation (MDO) machine wherein there exists a second nip roll set (10) which feeds the film into the MDO machine and which is rotating at the same lineal surface speed as the previous exit nip rollers. This nip roller set is preferably heated to a temperature that may be up to 150 degrees Celsius but more preferably is heated so as to raise the temperature of the sheet to approximately 55 to 75 degrees Celsius, given consideration to the line speed, film thickness, film input temperature and the distance the film travels in contact with the hot roller.

The sheet is immediately passed through a third set of nip rollers (12) which are cooled to preferably 40 degrees Celsius or more preferably ambient temperature but more preferably to approximately 15 degrees Celsius to chill the sheet prior to the sheet retuning to ambient temperature. This third set of nip rollers preferably rotate at between 150% and 300% faster than the second heated nip rollers set. On occasion it may be preferable to rotate the third set of nip rollers at faster rates so as to stretch the sheet by a greater amount.

The sheet is stretched between the second and third sets of nip rollers and is maintained under the full stretching stress and is not allowed to relax prior to the film temperature being reduced to preferably approximately 15 degrees Celsius or at least ambient temperature.

Between the second and third set of nip rollers are placed smaller idler rollers (11) which reduce the amount of film that is unsupported during the stretching process. The shorter the amount of sheet unsupported the less will be the neck-down (width narrowing) due to the stretching.

Upon exiting the MDO machine the film passes through a printing station where plant lines are printed onto the film.

Subsequently the sheet has two edge trims cut away (13) so as to ensure the thicker edge section of the film does not impact on the even thickness of the film across the web. The film may then be rolled onto a cardboard tube inner core as a single wound sheet from a cast line or blocked blown film line or if the film is in the form of 2 flat sheets the sheets may be split into two separate sheets (14) and then rolled onto two core tubes (15), containing the desired number of metres of mulch film, as single wound sheet.

During the MDO process the film which is fed into the MDO machine is extruded initially thicker than is required and is drawn narrower and thinner, however the thinner film retains the tensile properties of the thicker in-feeding film requiring as much force to ultimately break the thin film as is required to break the thicker film.

On occasion it may be that the extruded film has the thickness profile of the bubble or cast sheet altered, i.e. made thin on the edges, so as to accommodate the thicker edges arising after the film is subjected to MDO. This alteration provides a film being fed into the MDO machine which has thinner edges than the remaining body of the film when measured across the width of the web, so that as the film necks in during MDO the thickening of the edges is compensated for by the infeed film being made thinner at the edges. This effect may be so efficient at removing thick edges that no trim, or a reduced trim, need be taken from the edges.

By conducting the MDO process at temperatures of between 55 and 75 degrees Celsius and quickly cooling the film while under full stretching stress, the film retains a measure of plastic elongation which allows it to achieves a shrinkage of approximately 25% when the surface of the film is subsequently raised above 55 degrees Celsius as occurs, for example, when completely opaque mulch film is exposed to solar radiation. This shrinking effect commences at temperatures as low as 40 degrees C. and the rate of shrinkage increases as the temperature is increased.

It is possible to stretch linear low density polyethylene at ambient temperatures of around 20 degrees Celsius without having the film snap and break, however the speed at which the film may be stretched is substantially reduced, the extent to which the film may be stretched is reduced and the amount of neck down, and consequent trim wastage experienced is increased, when compared to heated MDO.

By raising the temperature of the film during the stretching process, it is possible to achieve a faster, smoother and more uniform stretch than could be achieved by cold stretching the film at ambient temperature and allows the film to be stretched inline. This is especially applicable where lower percentages of stretch are employed. The increase in temperature of the film also allows stretch percentages above 100% to take place, at normal production speeds, without having the film web break off during the stretching process.

However, mulch film which has been elongated beyond its yield point at ambient temperature and which shrinks when exposed to solar radiation is also included as a method of manufacturing the heat shrinking mulch film.

Obviously the temperature that the film achieves during stretching will depend on the temperature of the in-feeding nip roller, the speed at which the film passes through the nip and the length of time the film is in contact with the heated nip.

If the farmer using the mulch film is planting his seedlings close together, say 150 mm or less, high levels of stretch, above 300%, can cause the film to become very linear and to split between the holes, especially when the film is being lifted from the ground, making it difficult to remove by mechanical means.

If a high stretch ratio above 300% is employed the film may become easy to split and may split when placed under the tuck wheels of a laying machine.

It has been noted that stretch ratios of between 1:2 and 1:3 will achieve sufficient shrinkage in the film to ensure it shrinks and does not flap in the wind.

Should the mulch sheet be comprised of two sheets blocked and bonded to form a single sheet the two separate sheets support each other so that any propensity to split in one film is countered by the second bonded sheet, this allows for higher stretch ratios as much as 1:6 to be employed.

The third set of nip rollers feeds the film out of the MDO machine and is chilled to approximately 15 degrees Celsius and freezes in the stresses imposed on the film during the stretching process by chilling the film while it is still undergoing the stress of being stretched.

The shrinking stresses in the film arise as to the long chain polymer molecules, which exist as coiled crystals and randomly laid chains, are extended in a linear direction while at an elevated temperature, which softens the polymer, and then cooled below that temperature so that they cannot easily return to their original form without being raised to a similar temperature as they were stretched under.

Subsequent to passing through the MDO section a trim is taken from both sides of the film allowing the two flattened sheets of plastic to be separated and wound up on cardboard tubes as single wound sheeting.

Having produced a sheet of mulch film according to the methods described above, several changes to the properties of the film will be noticed when compared to prior art mulch film.

Firstly it will be noticed that the film has improved tensile properties in the machine direction even though it has been drawn thinner. This is to be expected as the film starts out as a thick film and retains the tensile properties of that thick film even when being drawn thin.

Also during the MDO process both main chain molecules and side branched molecules are aligned in the machine direction improving the breaking strength in that direction. Less crystallization will also take place as the molecules are forced into a straightened form rather than being allowed to coil into a crystal.

Secondly when placed in direct sunlight the film will shrink in surface area by a minimum 25%. Prior to being placed in the sunlight the film does not shrink and it will commence shrinking as soon as the solar radiation trapped by the carbon black in the film heats the film to above 40 to 55 degrees Celsius. This shrinkage occurs even though the solar energy only needs to raise the surface temperatures to between 40 to 55 degrees Celsius, although much higher temperatures may be achieved in hot climates.

It will be noticed that the film does not immediately expand when heated by solar radiation. When the stretched heat shrink mulch film reaches sufficient temperature to achieve the freedom of molecular movement to allow expansion, the in-built shrink stresses contained in the film causes it to shrink by a greater proportion than it will expand.

The speed of this shrinkage is determined by the level of temperature rise which is determined by the strength of the solar energy striking the film and the outer colour of the film. In hot conditions with bright summer sunlight the film shrinks quickly and, if unrestricted, can be visibly seen to be shrinking as soon as it is exposed to sunlight. In colder conditions with weaker sunlight such as in autumn the film shrinks slower and may take several minutes to reach its maximum shrinkage.

Shrinking mulch film made according to this application can be made thinner than normally required as the film does not need to have the strength to sustain its integrity by being stretched tightly by the tuck wheels over what can often be rough soil and stones. The film may be laid loosely and then employ solar energy to shrink and tighten over the bed. This allows for saving in plastic materials, cost of mulch film, cost of laying time as the laying machine may travel faster if there is no need to pull the film tightly over the bed.

This slightly delayed shrinkage is advantageous because the mulch film may be laid onto the bed using existing mulch laying equipment without the risk of the film shrinking away from edge tuck wheels and once laid and the edges are buried, the film will then shrink to the limits imposed by the buried edges and the shape of the growing bed.

This shrinkage is surprizing as normally sheets of film made from linear low density polyethylene or metalocene linear low density manufactured by the blown film process does not shrink substantially when subject to heat. Most commercial heat shrink films are made from low density polyethylene which does have a propensity to shrink. Sheets made from pure low density polyethylene do not have the tensile properties to be successfully used as mulch film, especially when compared to the much improved tensile properties of LLDPE or mLLDPE films.

Commercial heat shrink film, employing heat shrink tunnels or hot air blowers, initially expands as it approaches its melting point temperature, above which it will shrink. This innovative heat shrink mulch film does not initially expand but rather immediately shrinks once its temperature is sufficiently raised.

Also surprizing is the low temperature at which the film shrinks, normally polyethylene has to be raised in temperature to near its melting point (approximately 110 to 120 degrees Celsius) in order to achieve shrinkage in the film. This is due to the shrink memory of the polymer caused by the blown film process in which the polymer is stressed as it is stretched in the transverse direction as it exits the extrusion die over the air trapped in the bubble and is further stretched in the longitudinal direction by being drawn upwards by the top nip rollers. This stress is locked into the sheet at the time it solidifies during the extrusion process at approximately 110 to 120 degrees Celsius.

Prior art film manufactured using the cast extrusion method is a stable product that does not normally shrink at all when re-heated, although it may expand. Mulch films made using this innovative heat shrink mulch film method of manufacture will shrink in the sun even though the initial film has been made by the cast film process.

By subjecting the agricultural mulch film to heated MDO without post relaxation, stresses are built into the film which, surprisingly, allows it to shrink at the relatively low temperatures achieved by the film when heated under the effects of solar radiation being absorbed by the colour additives in the film.

The polymer normally has to be raised to close to the melting temperature of the polymer prior to shrinkage beginning.

To have the mulch film shrink by up to 25% when heated to only 55 degrees Celsius is very unusual, but this ability proves to be very useful in preventing flapping and billowing in the mulch film.

The high level of carbon black contained in the film absorbs the light striking the mulch film placed on a crop growing bed, this light is converted into heat which provides the energy to increase the temperature of the film by in excess of 55 degrees Celsius at which temperature the contained stresses in the film are released causing the film to permanently shrink in surface area.

Should the mulch film be restrained as it shrinks by, for example, having the edges of the sheet buried, the long chain polymer molecules will shrink to a point where the molecules shrink plastically by more than they will be physically allowed, this draws the film very tight and builds into the film a measure of elasticity. When the film is cooled such as at night elastic tension is formed into the film so that as it re-heats the following day it will remain tight over the bed.

Should the film be made clear it is possible for mulch film made according to this invention to shrink as the film will heat the soil which will heat the air trapped between the film and the soil and the air will heat the film causing it to shrink.

The shrinking ability of mulch film made according to this invention considerably improves the quality and effectiveness of the mulch film when compared to existing prior art plastic mulch films, particularly when considering that the shrinking effect is present in both black mulch film and black/white mulch film and clear mulch film.

Figure 3:
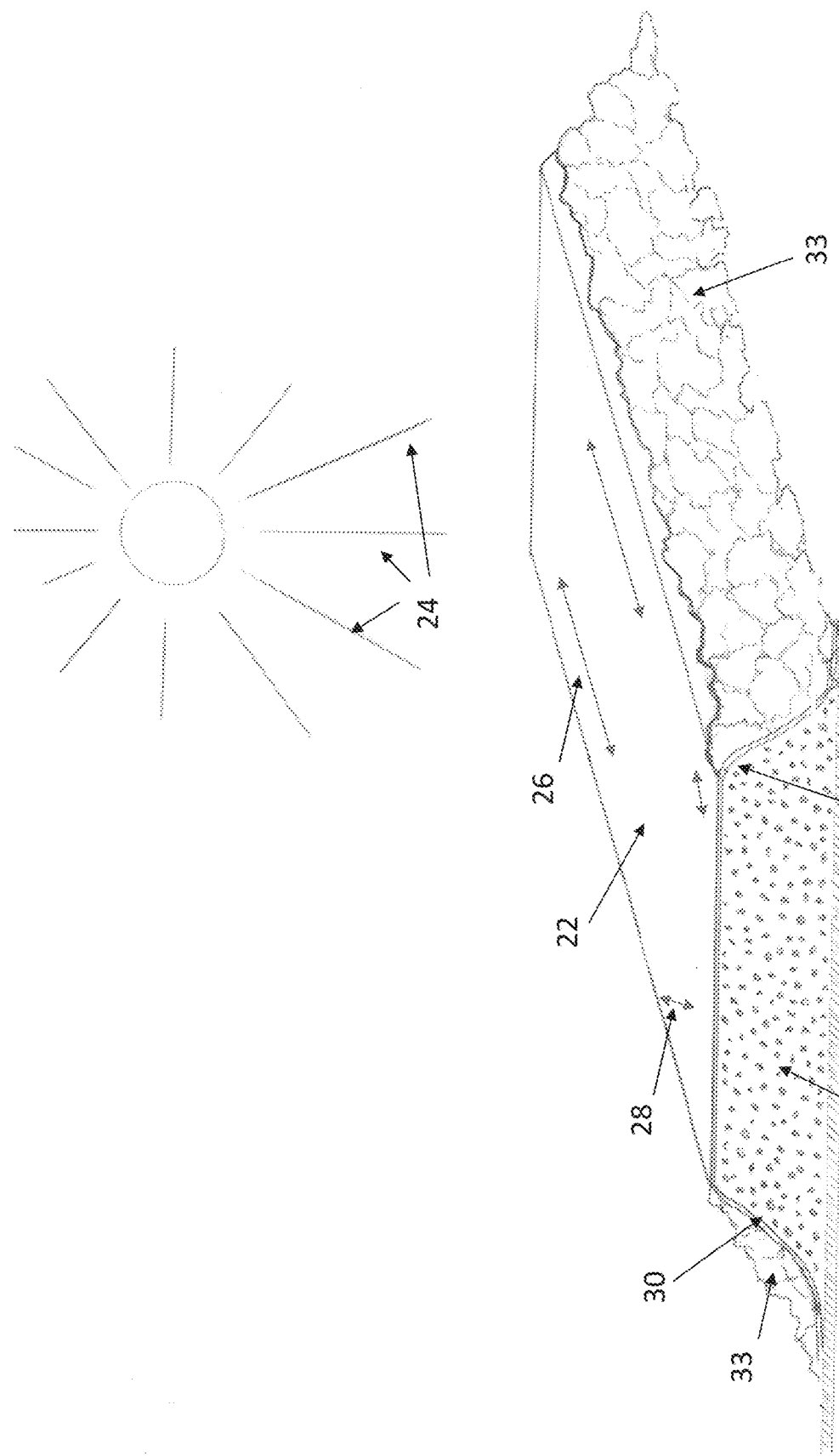
FIGS. 3, 4 and 5B show a preferred embodiment and its use according to the invention.
Figure 4:
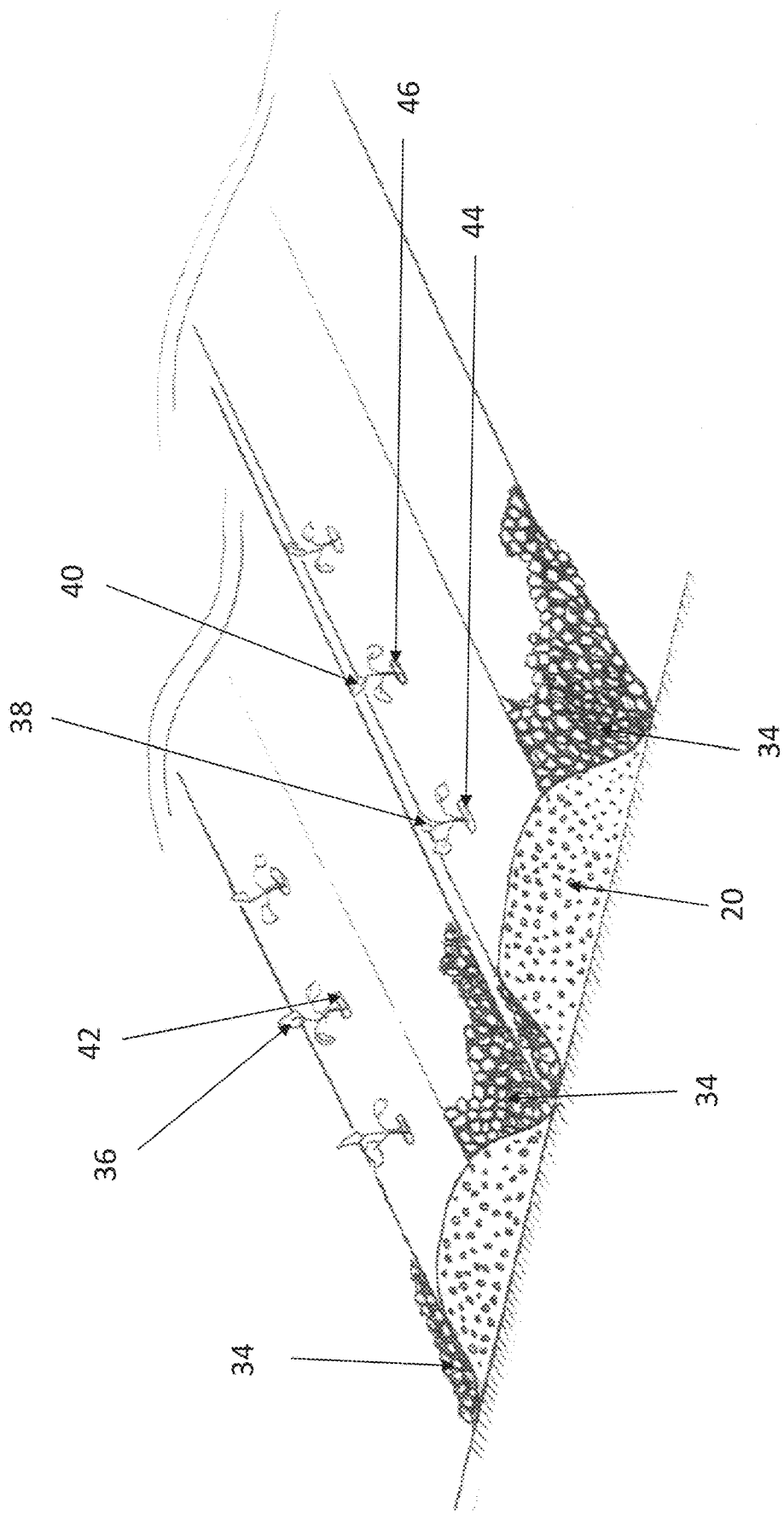
Figure 5A:
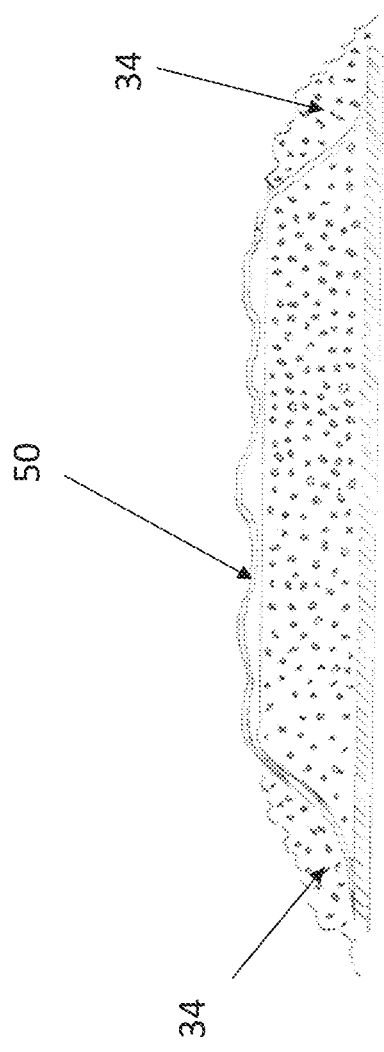
FIG. 5A shows the contrasting operation of prior art mulch film when compared to the invention.
Figure 5B:
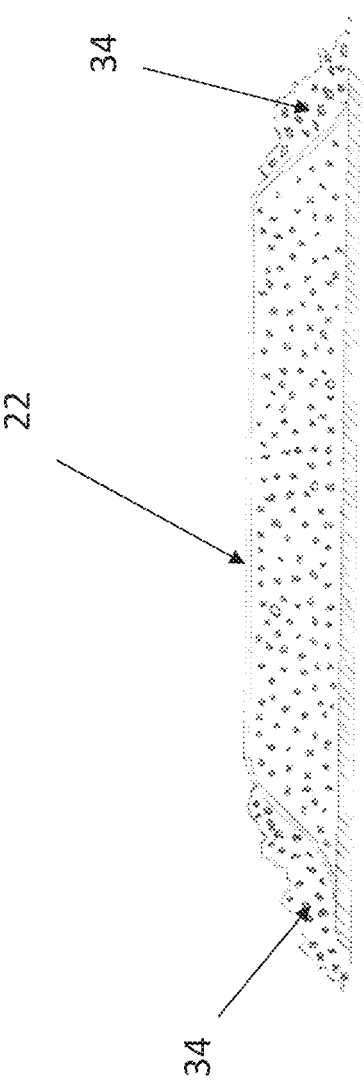

Referring to FIGS. 3, 4 and 5B, when unwound and applied to the surface of a raised growing bed (20) the mulch film (22 is exposed to solar radiation (24). This radiation is absorbed by the colour additives contained in the film which raises the surface temperature of the mulch sheet to as much as 70 degrees Celsius or more. This raising of the surface temperature makes it easier for the stretched molecules to de-stress and shrink back, mainly lengthwise (26) and partially crosswise (28) to their pre MDO stretched length or at least to partially contract wherein as a consequence the entire surface area of the sheet is reduced.

As the temperature of the mulch sheet rises, should the sheet be unrestrained, the first physical signs of the sheet being affected by the rise in temperature is for the sheet to shrink. In contrast to the invention, prior art mulch film (see 50 in FIG. 5A), which has not been pre-treated during manufacture according to the methods described above, will instead expand but not shrink as the temperature is increased.

Should sections of the mulch film be buried (30, 32), due to the weight of the soil (34), the exposed area will not be able to shrink in overall surface area but will shrink as tightly as possible against the profile of the growing bed (20). As a consequence, seedlings (36, 38, 40) growing through planting holes (42, 44, 46) will not be damaged either by the sheet flapping in the wind or rubbing against the stems of the seedlings.

FIGS. 5A and 5B are instructive in the operation of the invention. In FIG. 5A, prior art mulch film (50) even if buried under soil (34) expands rather than contracts in the heat of the sun. The loose film can allow air to lift it and flap during strong wind and to damage seedlings (not shown) as previously described.

FIG. 5B shows the operation of the present mulch film (22) which also buried under soil (34) wherein the more radiation applied to the film (22), the more it shrinks. This is in contrast to prior art mulch film (50) which increasingly stretches when exposed to solar radiation. This result is due to the longitudinal pre-straining of the present mulch film at a predetermined tension and temperature and immediately cooling it. The resultant molecular stresses in the material facilitate shrinkage but not expansion on exposure to solar radiation. This property of the subject solar reactive mulch and its methods of manufacture are hitherto unknown in the field of agricultural sheet mulches and comprises the inventive step of the invention.

EXAMPLES

Using a non-damaging felt tipped pen, two lines were drawn 100 mm apart along the machine direction of a sample of black mulch film and a sample of black/white mulch film. A further two lines were drawn on each sample 100 mm apart along the transverse direction of the samples.

The mulch film samples had both been manufactured according to this application and had been stretched at a temperature of 75° C. having the outfeed chilled nip rollers rotating 3 times faster than the infeed heated rollers. The samples had a uniform thickness of 18 to 21 microns and had been drawn down from an infeed blown film having a thickness of 55 microns.

The samples were taken from rolls of film which had been stored indoors and the sample pieces were then taken outdoors and placed flat on soil.

The ambient temperature was 25° C. and it was a cloudless day at 1:00 pm in autumn in Brisbane Australia.

The temperature of the exposed film was assessed using a contactless thermometer and rose to between 60 and 70 degrees for the black sample and between 50 and 60 degrees for the white sample.

The film could be seen to commence shrinking within seconds of being placed on the ground and appeared to have ceased shrinking within one minute. The distances between the lines was re-measured and it was found that the black mulch film had shrunk by 28% in the machine direction and by 4% in the transverse direction, the black/white film, which had the white side facing upwards, had shrunk by 24% in the machine direction and 3% in the transverse direction.

Further practical trials of full length mulch rolls have been performed on various farms having different soil types and climatic conditions and all have shown that the film can be laid by machine at higher speeds and lower tension than prior art mulch and that the mulch film manufactured according to this application, proceeds to shrink and tighten onto the growing bed sufficiently to overcome wind caused flapping.

The trials have indicated that the film does last, intact, for a full growing season of 9 months and is able to be lifted from the ground by mechanical means at the end of the season.

It will of course be realized that while the foregoing has been given by way of illustrative example of this invention, all such and other modifications and variations there to as would be apparent to persons skilled in the art are deemed to fall within the broad scope and ambit of this invention as is herein set forth.

In the specification the terms "comprising" and "containing" shall be understood to have a broad meaning similar to the term "including" and will be understood to imply the inclusion of a stated integer or step or group of integers or steps but not the exclusion of any other integer or step or group of integers or steps. This definition also applies to variations on the terms 'comprising' and "containing" such as "comprise", "comprises", "contain" and "contains".

What is claimed is:

1. A solar-reactive agricultural mulch film comprising:
a sheet of heat-shrink material including one or more layers of linear low density polyethylene (LLDPE) and/or metalocene linear low density polyethylene (mLLDPE), wherein one or more of the layers of LLDPE and/or mLLDPE having dispersed, in a polyethylene consisting essentially of LLDPE and/or mLLDPE, carbon black particles, in an amount that ranges between 2% and 8% by weight, that absorb radiant energy from sunlight and convert the radiant energy to heat, such that a surface temperature of the sheet is raised to at least a shrinking temperature of 40° C., which is above an ambient surface temperature of the sheet but not above a melting point of one or more of the layers of LLDPE and/or mLLDPE; and wherein, when one or more of the layers of LLDPE and/or mLLDPE is less than the shrinking temperature, each of one or more of the layers of LLDPE and/or mLLDPE is elongated, in a lengthwise direction, beyond a yield point of each of one or more of the layers of LLDPE and/or mLLDPE such that main chain molecules of the LLDPE and/or mLLDPE and/or side branched molecules of the LLDPE and/or mLLDPE in each of one or more of the layers of LLDPE and/or mLLDPE are aligned and elongated in the lengthwise direction and resultant plastic deformation stresses, resulting from elongation beyond the yield point, are retained and each of one or more of the layers of LLDPE and/or mLLDPE does not shrink.

2. The solar-reactive agricultural mulch film of claim 1, wherein the sheet of heat shrink material comprises:
a single-wound plastic sheet; or
a bonded and blocked double-wound plastic sheet forming a single resulting sheet.

3. The solar-reactive agricultural mulch film of claim 1, wherein the film further comprises at least one additive selected from the group consisting of:
a process aid;
an anti-oxidization additive;
an ultraviolet light stabilizer;
an ultraviolet light absorber;
a plasticizer; and
a lubricant.

4. The solar-reactive agricultural mulch film of claim 3, wherein the ultraviolet light stabilizer comprises a hindered-amine light stabilizer (HALS).

5. The solar-reactive agricultural mulch film of claim 1, wherein the sheet of heat-shrink material comprises two or more co-extruded layers of LLDPE and/or mLLDPE.

6. The solar-reactive agricultural mulch film of claim 1, wherein a one or more of the layers of LLDPE and/or mLLDPE is impermeable to gas.

7. The solar-reactive agricultural mulch film of claim 1, wherein one or more of the layers of LLDPE and/or mLL- DPE contains carbon black particles having a particle size that ranges between 17 and 100 nanometers.

8. The solar-reactive agricultural mulch film of claim 1, wherein the carbon black particles are provided in one or more of the layers of LLDPE and/or mLLDPE so that the sheet of heat-shrink material is black in color or opaque to ensure the sheet of heat-shrink material blocks light transmission and absorbs sufficient solar energy to heat the sheet of heat-shrink material sufficiently to initiate shrinkage.

9. The solar-reactive agricultural mulch film of claim 1, wherein the carbon black particles are present in an amount between 4% and 7% by weight of at least one of the layers of LLDPE and/or mLLDPE and have a particle size that ranges between 17 and 50 nanometers in size.

10. The solar-reactive agricultural mulch film of claim 1, wherein the carbon black particles are present in an amount between 5.6% and 6.4% by weight of at least one of the layers of LLDPE and/or mLLDPE and have a particle size that ranges between 17 and 21 nanometers in size.

11. The solar-reactive agricultural mulch film of claim 1, wherein an upper surface of the solar-reactive agricultural mulch film is white.

12. The solar-reactive agricultural mulch film of claim 1, wherein the sheet of heat-shrink material has different colors on either surface.

13. The solar-reactive agricultural mulch film of claim 1, wherein one or more of the layers of LLDPE and/or mLLDPE shrinks at least 25% in the lengthwise direction once the surface temperature of the sheet of heat-shrink material reaches 40° C.

14. The solar-reactive agricultural mulch film of claim 1, wherein the heat-shrink material comprises the mLLDPE.

15. The solar-reactive agricultural mulch film of claim 1, wherein the heat-shrink material has a uniform thickness.

16. The solar-reactive agricultural mulch film of claim 1, wherein, during an operational state of the solar-reactive agricultural mulch film, when the shrinking temperature of the sheet of the heat-shrink material reaches or exceeds the shrinking temperature, the sheet of heat-shrink material shrinks substantially in the lengthwise direction such that at least a portion of the main chain molecules of the LLDPE and/or the mLLDPE and/or the side branched molecules of the LLDPE and/or the mLLDPE are not aligned in the lengthwise direction to reduce the deformation stresses of the sheet of heat-shrink material.

17. The solar-reactive agricultural mulch film of claim 1, wherein, during an operational state of the solar-reactive agricultural mulch film, the sheet of heat shrink material is placed adjacent to a surface of a growing bed and when the shrinking temperature of the sheet of the heat-shrink material reaches or exceeds the shrinking temperature, the sheet of heat-shrink material shrinks such that the sheet of heat-shrink material tightens against the surface of the growing bed, and does not expand.

* * * * *